(12) United States Patent
Chang et al.

(10) Patent No.: US 11,875,951 B2
(45) Date of Patent: Jan. 16, 2024

(54) BUTTON STRUCTURE AND ELECTRONIC DEVICE

(71) Applicant: WISTRON CORP., New Taipei (TW)

(72) Inventors: Te-Wei Chang, New Taipei (TW); Chih-Wei Hsu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/720,599

(22) Filed: Apr. 14, 2022

(65) Prior Publication Data

US 2023/0178313 A1 Jun. 8, 2023

(30) Foreign Application Priority Data

Dec. 8, 2021 (TW) .................................. 110145858

(51) Int. Cl.
*H01H 13/705* (2006.01)
*G06F 3/01* (2006.01)

(52) U.S. Cl.
CPC .......... *H01H 13/705* (2013.01); *G06F 3/016* (2013.01)

(58) Field of Classification Search
CPC .. H01H 3/00; H01H 3/02; H01H 3/12; H01H 3/122; H01H 3/16; H01H 9/00; H01H 9/02; H01H 9/04; H01H 2003/00; H01H 2003/02; H01H 2003/12; H01H 2003/16; H01H 2009/02; H01H 2009/04; H01H 2013/00; H01H 2013/04; H01H 2013/50; H01H 2013/56; H01H 2013/52; H01H 2223/00; H01H 2223/01; H01H 2223/012; H01H 2223/04; H01H 2223/042; H01H 2223/044; H01H 13/00; H01H 13/12; H01H 13/14; H01H 13/20; H01H 13/26; H01H 13/50; H01H 13/705; H01H 13/52; H01H 13/70; G06F 3/016; G06F 3/01
USPC ......................................................... 200/530
See application file for complete search history.

(56) References Cited

U.S. PATENT DOCUMENTS

| | | | | |
|---|---|---|---|---|
| 5,899,616 | A * | 5/1999 | Caplan | G06F 3/03543 400/489 |
| 5,982,881 | A * | 11/1999 | Mischenko | H04M 1/0216 379/434 |
| 7,094,985 | B2 | 8/2006 | Kobayashi et al. | |
| 8,805,458 | B2 * | 8/2014 | Strittmatter | H01M 50/209 361/679.02 |
| 10,886,082 | B1 * | 1/2021 | Wang | H01H 13/83 |
| 2009/0020402 | A1 * | 1/2009 | Ichikawa | H01H 13/06 200/341 |

(Continued)

FOREIGN PATENT DOCUMENTS

TW 200402746 A 2/2004

OTHER PUBLICATIONS

TW Office Action dated Jul. 18, 2022 in Taiwan application No. 110145858.

*Primary Examiner* — Anthony R Jimenez
(74) *Attorney, Agent, or Firm* — McClure, Qualey & Rodack, LLP (57) ABSTRACT

A button structure includes a circuit board, a first portion, a second portion, and a reinforcement structure. The circuit board has a switch thereon. The first portion is located above the switch. The second portion partially covers the first portion and surrounds the first portion. The reinforcement structure is disposed on the first portion. The reinforcement structure is higher than the first portion in Young's modulus.

19 Claims, 7 Drawing Sheets

(56) References Cited

U.S. PATENT DOCUMENTS

2010/0108486 A1\* 5/2010 Yoshida ................ H01H 13/85
200/310
2014/0318942 A1 10/2014 Takemae et al.
2021/0168231 A1\* 6/2021 Baker ................ H05K 5/0086

\* cited by examiner

BUTTON STRUCTURE AND ELECTRONIC DEVICE

CROSS-REFERENCE TO RELATED APPLICATIONS

This non-provisional application claims priority under 35 U.S.C. § 119(a) on Patent Application No(s). 110145858 filed in Taiwan (R.O.C.) on Dec. 8, 2021, the entire contents of which are hereby incorporated by reference.

TECHNICAL FIELD

The disclosure relates to a button structure, more particularly to a button structure and an electronic device that have a reinforcement structure.

BACKGROUND

Button is a switch mechanism widely and commonly used in various daily and industrial applications to provide an interface for users to control specific functions of a machine or a process. In some cases, a button is manufactured as an independent input device that can be arranged at places as required.

For example, in daycare and healthcare centers, emergency buttons are arranged at places easy to access, such as bedside or toilet, such that the users are able to call a live emergency response system simply with a press when there is a medical concern. Also, to make the press easily succeed by users, emergency buttons generally have a surface large enough for reliable interaction. In specific, a press surface of an emergency button is sized to be larger than a fingertip. Besides, for the concerns of waterproof and haptic feedback, part of the press surface is made of softer material.

However, due to the size of the press surface, the press surface needs a long and hard press to be able to activate the switch underneath when the user presses the edge sides, which results in poor haptic feedback and risk of unsuccessful call for help. Similarly, the aforementioned problems also occur in other types of buttons having a large press surface.

SUMMARY

Accordingly, one aspect of the disclosure is to provide a button structure and an electronic device that are capable of providing a reliable and responsive interaction.

One embodiment of the disclosure provides a button structure including a circuit board, a first portion, a second portion, and a reinforcement structure. The circuit board has a switch thereon. The first portion is located above the switch. The second portion partially covers the first portion and surrounds the first portion. The reinforcement structure is disposed on the first portion. The reinforcement structure is higher than the first portion in Young's modulus.

Another embodiment of the disclosure provides an electronic device including an outer casing, a first portion, a circuit board, and a reinforcement structure. The outer casing has an accommodation space. The first portion is disposed on the outer casing and located at a side of the accommodation space. The circuit board is accommodated in the accommodation space. The circuit board has a switch thereon, and the switch corresponds to the first portion. The reinforcement structure is disposed on the first portion. An orthogonal projection of the reinforcement structure from the first portion onto a plane in which the circuit board is located does not overlap with an orthogonal projection of the outer casing from the first portion onto the plane.

According to the button structure and electronic device as discussed in the above embodiments of the disclosure, since the first portion located above the switch has a reinforcement structure thereon, the elastic deformation produced by applying force to the first portion is able to increase the downward movement of the first portion through the reinforcement structure. This ensures a press either near or away from the central area of the first portion to be able to easily and effectively trigger the switch below, thereby solving the problems of traditional buttons that have poor haptic feedback at specific press areas.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Generally, the embodiments of the disclosure provide exemplary button structures providing a relatively large press surface (larger than a fingertip) while ensuring a press away from the central area to be able to easily activate its switch.

Firstly, referring to FIGS. 1-4, one embodiment of the disclosure provides a button structure 1. Note that the button structures provided below with reference drawings are illustrated in a simplified manner, and the proportions and sizes of the illustrated elements are for easier viewing but not limiting. Also, for ease of explanation, some elements shown in the drawings may be illustrated by dotted lines while other elements irrelevant to the spirit of the disclosure may be omitted.

In this embodiment, the button structure 1 may include a first portion 20, a second portion 11, a circuit board 40, and a reinforcement structure 30. The first portion 20 means a softer and elastic part of the button structure 1. The first portion 20 is suitable to be pressed by a finger. The second portion 11 means the part of the button structure 1 to support the first portion 20. The circuit board 40 is configured to support various electrical/non-electrical components used for achieving required functions of the button structure 1. In such an arrangement, the button structure 1 can be considered as an electronic device or an input device. The reinforcement structure 30 is disposed on the first portion 20. The reinforcement structure 30 is harder than the first portion 20. Specifically, the reinforcement structure 30 has a higher Young's modulus than the first portion 20, thus, the existence of the reinforcement structure 30 is able to extend the elastic deformation caused by the press near the edge side of the first portion 20 towards the central area of the first portion 20.

Figure 1:
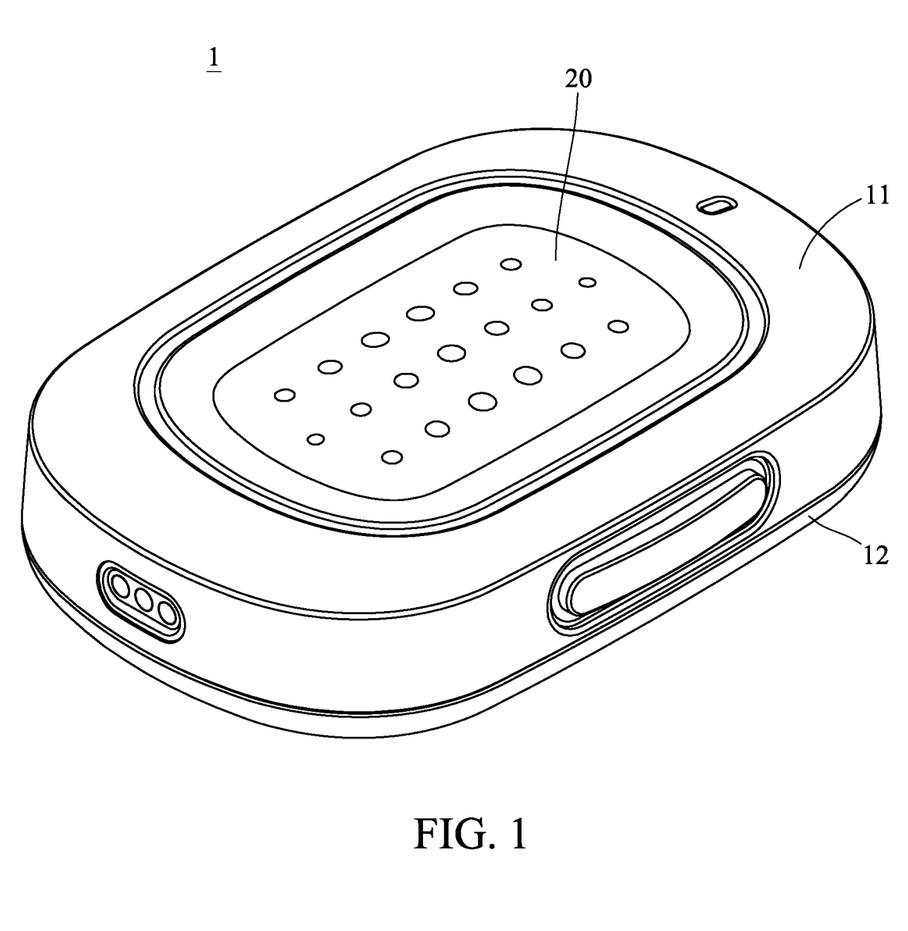
FIG. 1 is a perspective view of a button structure according to one embodiment of the disclosure.
Figure 2:
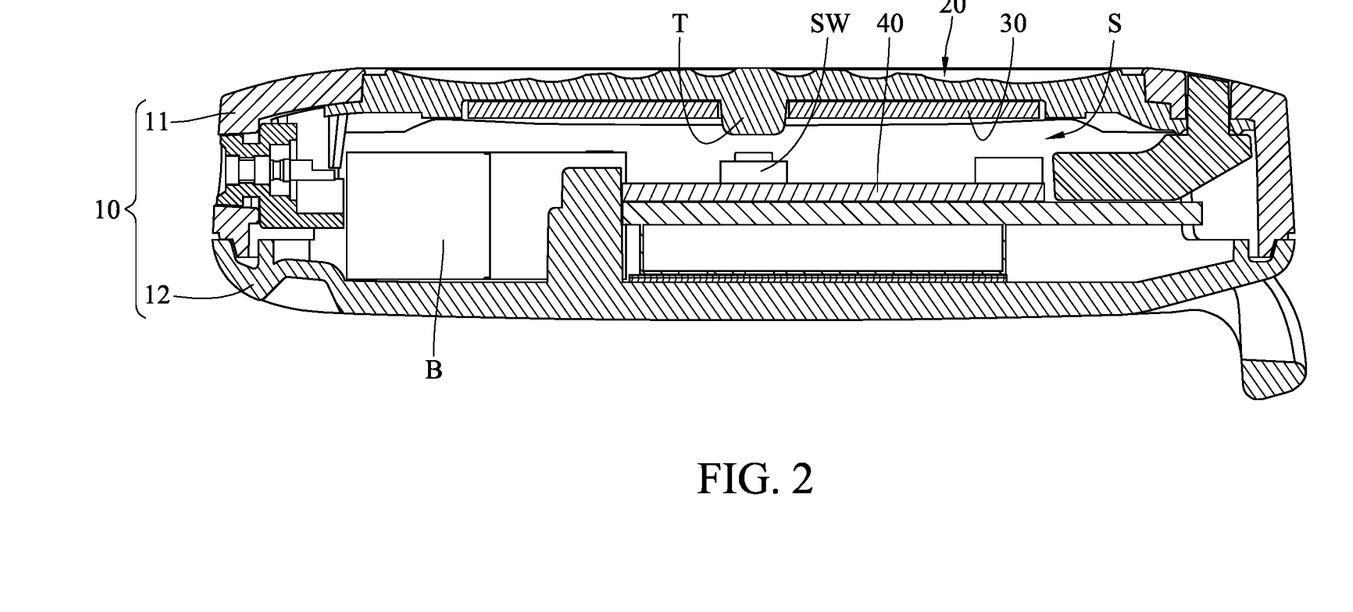
FIG. 2 is a cross-section view of the button structure in FIG. 1.

Optionally, the button structure 1 may further include a third portion 12. The second portion 11 may be assembled to the third portion 12 in any suitable manner. The second portion 11 and the third portion 12 are able to define an accommodation space S therebetween. In other embodiments, the second portion and the third portion of the button structure may be integrally formed of a single piece. The second portion 11 and the third portion 12 together form an outer casing 10. The outer casing 10 is able to accommodate and support the aforementioned first portion 20, the circuit board 40, and other associated components. For example, there is a battery B arranged between the second portion 11 and the third portion 12, as shown, the battery B may be supported or fixed on the second portion 11 and/or the third portion 12. The battery B is electrically connected to the circuit board 40 and is configured to provide electricity for the operation of the button structure 1. Thus, the button structure 1 can be considered as a self-powered device. However, the battery B is optional; in some other embodiments, the button structure may not have any battery therein and may receive electricity from external system. It is noted that the second portion 11, the third portion 12, and/or the circuit board 40 may additionally have electrical/non-electrical components thereon according to actual requirements, such as switch, port, microprocessor, antenna, signal transmission module, light guide structure, circuits.

Optionally, the second portion 11 may have a higher Young's modulus than the first portion 20. For example, the first portion 20 may be made of soft and elastic material, such as silicon or rubber while the second portion 11 may be made of plastic that is harder than the first portion 20. Specifically, the first portion 20 may be made of TPEE (Thermoplastic Polyether Ester Elastomer) and have Young's modulus of approximately 57 MPa. Thus, the first portion 20 can be elastically deformed and moved relative to the second portion 11 when being pressed. Note that the first portion 20 may be connected to the second portion 11 in any suitable manner. For example, the second portion 11 and the first portion 20 may be connected to each other via adhesive or manufactured using two materials injection molding, but the disclosure is not limited thereto. In some other embodiments, the second portion of the button structure may have a Young's modulus substantially the same or lower than the first portion; in this case, it is possible that the second portion is made of the material the same as the first portion. For example, the first portion and second portions of the button structure in one embodiment may be integrally formed of the same material.

In this embodiment, the first portion 20 is partially exposed from the area surrounded by the second portion 11; in other words, the second portion 11 surrounds the first portion 20 and partially covers the first portion 20. Herein, define the exposed surface of the first portion 20 has a center C at the centroid of the first portion 20. Based on the center C, the first portion 20 may include a central area 21 and a periphery area 22. The central area 21 is connected to the second portion 11 via the periphery area 22. The central area 21 means an area of the first portion 20 located relatively closer to the center C (i.e., located relatively away from the second portion 11) while the periphery area 22 means an area of the first portion 20 located relatively away from the center C (i.e., located relatively closer to the second portion 11). It is noted that the central area 21 and the periphery area 22 are provided for easier explanation of the following descriptions but may not have an actual structural line therebetween.

The circuit board 40 may be fixed to the second portion 11 and/or the third portion 12 in any suitable manner. There is a switch SW protruding from the circuit board 40 and located under the first portion 20. Any typical switch can be employed as the switch SW. The switch SW is electrically connected to the circuit board 40 and is able to produce a response when being triggered. As shown, at least part of the first portion 20 is located above the switch SW. Specifically, the switch SW on the circuit board 40 is arranged between the central area 21 of the first portion 20 and the circuit board 40.

Optionally, the button structure 1 may include a contact structure T located between the first portion 20 and the circuit board 40. The contact structure T is movable by the first portion 20 and is configured to contact the switch SW. Specifically, the contact structure T is arranged between the central area 21 of the first portion 20 and the switch SW. In this embodiment, the contact structure T is integrally formed on a side of the first portion 20 facing towards the circuit board 40 and corresponding to the switch SW. In other words, the contact structure T can be considered as a protrusion of the first portion 20 extending towards the switch SW.

The reinforcement structure 30 is arranged at the side of the first portion 20 facing towards the circuit board 40 in any suitable manner. For example, the reinforcement structure 30 and the first portion 20 may be connected to each other via adhesive or manufactured using insert molding process or overmolding process, but the disclosure is not limited thereto. As shown, the reinforcement structure 30 may be a plated-shaped object. The reinforcement structure 30 may be arranged around the contact structure T. For example, the reinforcement structure 30 may overlap with the central area 21 of the first portion 20, and the reinforcement structure 30 may surround or connect the contact structure T.

Figure 3:
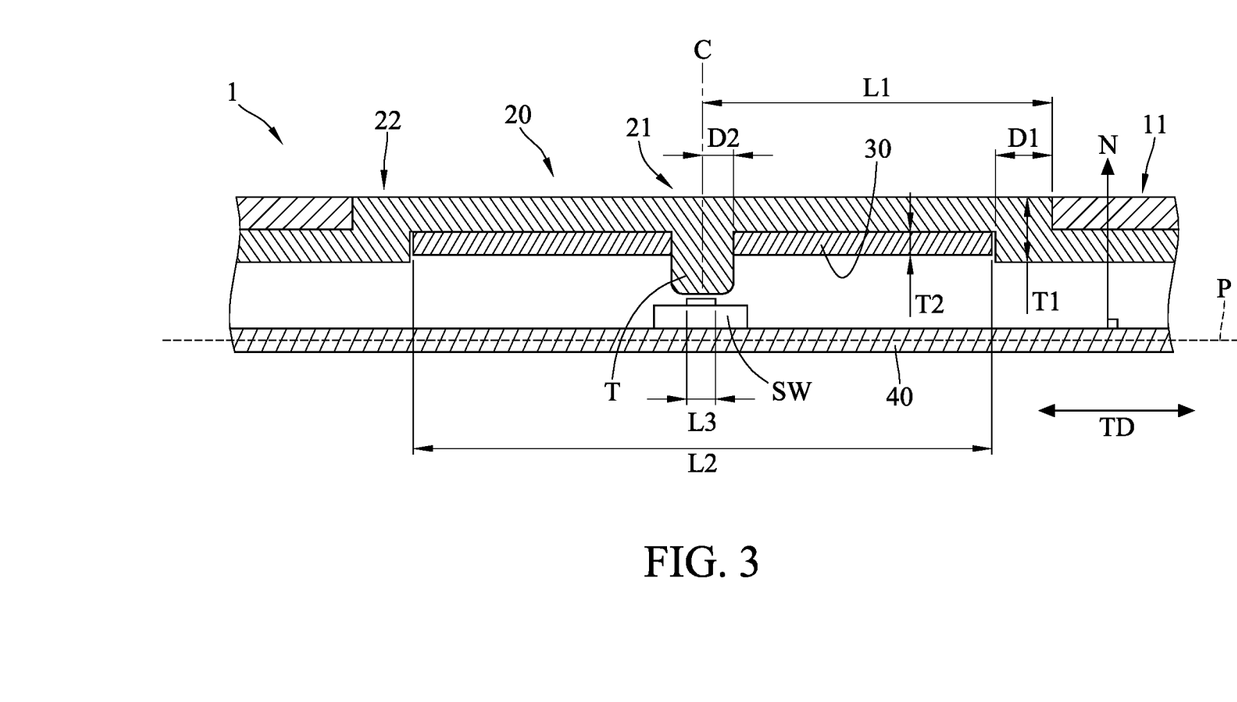
FIG. 3 is a partially enlarged view of the button structure in FIG. 2.
Figure 4:
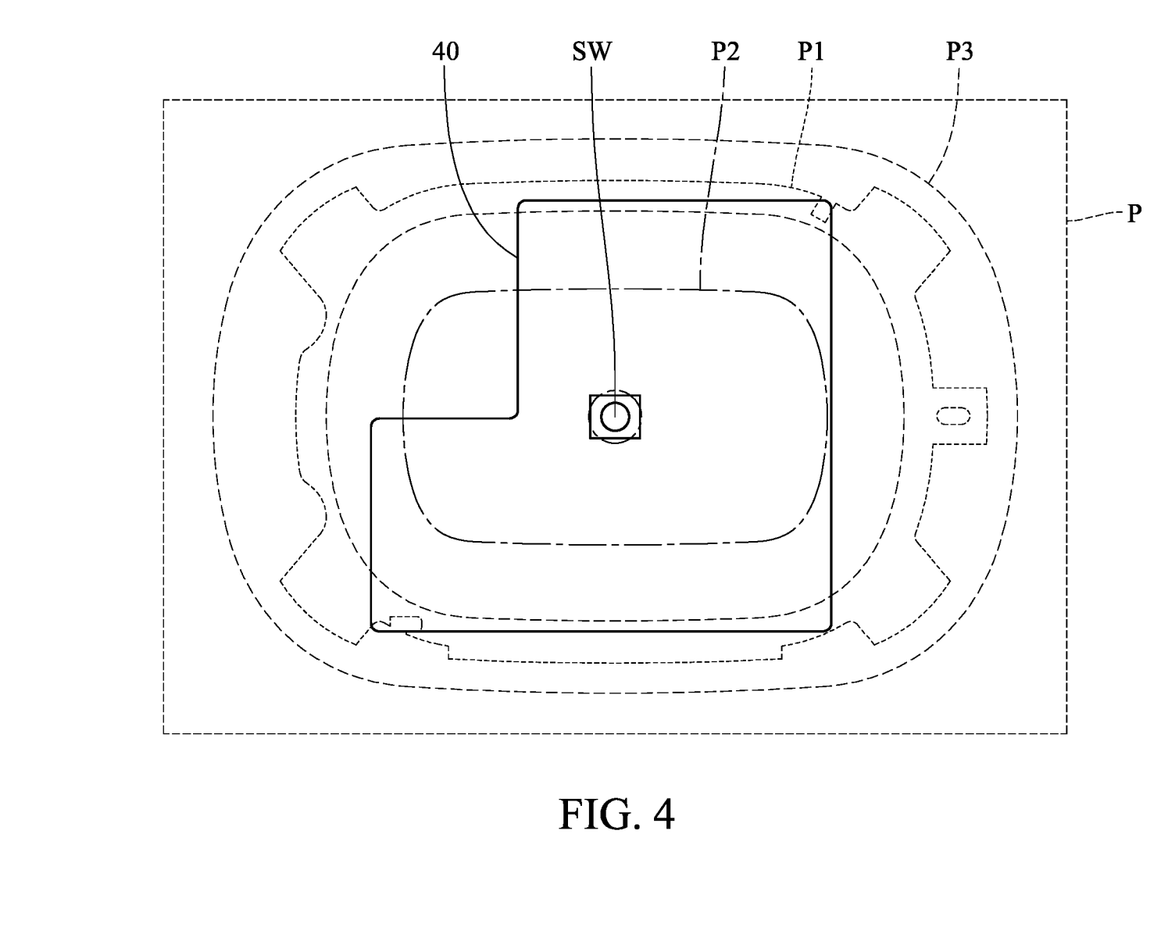
FIG. 4 is a schematic view showing orthogonal projections of first portion, second portion, and reinforcement structure of the button structure in FIG. 1 towards a plane in which a circuit board is located.

Specifically, in FIGS. 3-4, an orthogonal projection P1 of the first portion 20 onto a plane P in which the circuit board 40 is located overlaps with an orthogonal projection P2 of the reinforcement structure 30 onto the plane P. Meanwhile, the reinforcement structure 30 is spaced apart from the second portion 11, thus the orthogonal projection P2 does not overlap with an orthogonal projection P3 of the second portion 11 onto the plane P; in short, the orthogonal projections of the reinforcement structure 30 and the second portion 11 onto the plane P from the first portion 20 towards the circuit board 40 do not overlap with each other.

Also, the reinforcement structure 30 may be made of a material harder than the first portion 20. For example, the reinforcement structure 30 may be made of PC (Polycarbonate) and have Young's modulus of approximately 2236 MPa. It is noted that the reinforcement structure 30 may be made of a material having higher stiffness and rigidity. For example, the reinforcement structure 30 may be made of steel; in this case, the reinforcement structure 30 is allowed to be thinner while providing a required or higher rigidity. The disclosure is not limited by the material of the reinforcement structure; in some other embodiments, the reinforcement structure may be made of softer material; in this case, the reinforcement structure may have a thicker thickness that is enough to provide a required structural strength.

When the button structure 1 is applied to cases that have need of providing large and soft press surface (e.g., an emergency button used in daycare and healthcare centers), the part of the first portion 20 exposed from the second portion 11 has a surface area at least larger than a fingertip. This may make the first portion 20 and the switch SW have a relatively large difference in size, such that there is a relatively large distance between the edge side of the first portion 20 (i.e., the periphery area 22) and the switch SW. The existence of the reinforcement structure 30 is provided to ensure the press to the periphery area 22 to be able to easily activate the switch SW under this situation.

Herein, a transverse direction TD is defined to refer to a direction substantially parallel to the circuit board 40; specifically, the transverse direction TD indicates a direction that is substantially perpendicular to a normal line N of the circuit board 40. In the transverse direction TD, L1 denotes to a distance between the center C of the first portion 20 and the joint between the first portion 20 and the second portion 11, that is, the portion of the first portion 20 exposed from the second portion 11 has a length of 2×L1; D1 denotes to a distance between the reinforcement structure 30 and the second portion 11; D2 denotes to a distance between the reinforcement structure 30 and the center C of the first portion 20; T1 denotes to the thickness of the first portion 20; T2 denotes to the thickness of the reinforcement structure 30; L2 denotes to the length of the reinforcement structure 30; L3 denotes to the length of the switch SW. It is noted that the transverse direction TD is not limited to be defined along a major axis or a minor axis of the contour of the button structure 1; in one embodiment that the button structure has a contour in round shape, the transverse direction is defined in any radial direction of the contour.

In some embodiments, the part of the first portion 20 exposed from the second portion 11 may have a length (i.e., 2×L1) of at least larger than 30 millimeters, the switch SW has a length (i.e., L3) of approximately 1.7 mm; thus, 2×L1 is at least 17.6 times the L3 (i.e., 2L1/L3≥17.6). The reinforcement structure 30 is able to ensure the haptic feedback of the press of all parts of the first portion 20 even if such a size difference between the first portion 20 and the switch SW.

In one embodiment, one of the following conditions is satisfied:

$$8/3 \leq L1/D1 \leq 4; \text{ and}$$

$$2.93 \leq D1/T1 \leq 4.38.$$

Figure 5:
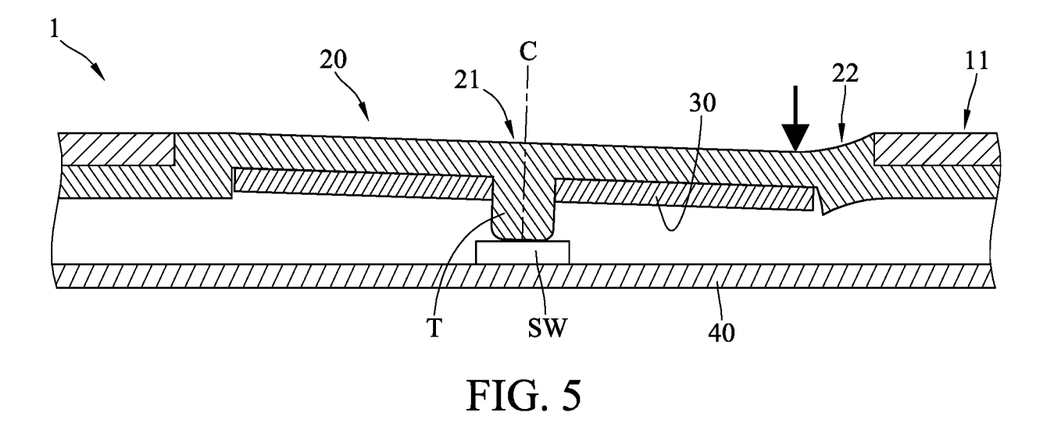
FIG. 5 is a schematic view showing how the button structure in FIG. 3 response to a press.

Please refer to FIG. 5, the aforementioned arrangement of the reinforcement structure 30 is able to increase the movement of the central area 21 caused by the elastic deformation at the periphery area 22 of the first portion 20. In other words, the reinforcement structure 30 is able to extend and enlarge the press on the periphery area 22 to the central area 21 so as to effectively cause the contact structure T to contact the switch SW. As such, the reinforcement structure 30 ensures a travel distance of the contact structure T that can activate the switch SW when the periphery area 22 of the first portion 20 is pressed; in other words, due to the reinforcement structure 30, it is possible to enable a successful trigger of the switch SW without a long and hard press to the edge sides of the first portion 20. This provides a reliable and responsive interaction and therefore solves the problems that the conventional buttons that have poor haptic feedback at specific press areas.

In some embodiments, the button structure 1 may further satisfy the following condition:

$$T2 \approx (1/30) \times L2.$$

For example, T2 is approximately 0.8 millimeters, and L2 is approximately 25.7 millimeters. This condition is favorable for the reinforcement structure 30 to offer a sufficient structural strength when having a relatively thin thickness.

In some embodiments, the button structure 1 may further satisfy the following conditions:

$$D1 \approx (1/4) \times L1;$$

$$T1 \approx (1/3) \times D1; \text{ and}$$

$$T1 \approx (1/12) \times L1.$$

For example, D1 is approximately 4.5 millimeters, L1 is approximately 17.5 millimeters, T1 is approximately 1.55 millimeters. These conditions are favorable for the reinforcement structure 30 to successfully activate the switch SW by a short press to the periphery area 22; in other words, the conditions are favorable for enabling a lighter push force to the periphery area 22 to be able to trigger the switch SW.

Herein, please see table 1 below, a result of an actual experiment with two experimental groups (No. 1 is the button structure 1 with L1/D1≈4, No. 2 is the button structure 1 with L1/D1≈8/3) and a control group (No. 3 is the button structure 1 without the reinforcement structure 30, i.e., D1=L1) is provided, where they were performed using a button load testing machine with a press head of diameter of 9 millimeters and a press pressure of about 1300 gf to simulate the press of human fingertip at the same spot. As shown, the control group fails to trigger the switch while the experimental groups that have reinforcement structure both successfully trigger the switch. This shows that the reinforcement structure is favorable for enabling the trigger of the switch and therefore provide a better haptic feedback.

TABLE 1

| No. | press force (gf) | successfully trigger switch |
|---|---|---|
| 1 | 1300 | yes |
| 2 | 1303 | yes |
| 3 | 1299 | no |

Experimental group No. 1: L1 ≈ 17.5 millimeters, D1 ≈ 4.5 millimeters, T1 ≈ 1.55 millimeters, L2 ≈ 25.7 millimeters, T2 ≈ 0.8 millimeters, L3 ≈ 1.7 millimeters, the reinforcement structure is made of PC, and the first portion is made of TPEE.
Experimental group No. 2: having the conditions the same as the experimental group No. 1 except for the D1 ≈ 6.5 millimeters.

Note that the aforementioned button structures or electronic devices are exemplary but not limiting. Instead, with the aforementioned exemplary and not limiting embodiments, it is apparent to those skilled in the art that various modifications and variations without departing from the scope or spirit of the disclosure can be made as required. The following provides button structures of other embodiments that can achieve the same effect as illustrated in FIG. 5. For the purpose of simple illustration, only the differences between the previous and following embodiments will be described in detail. Also, the same reference numbers denote to the same elements.

Figure 6:
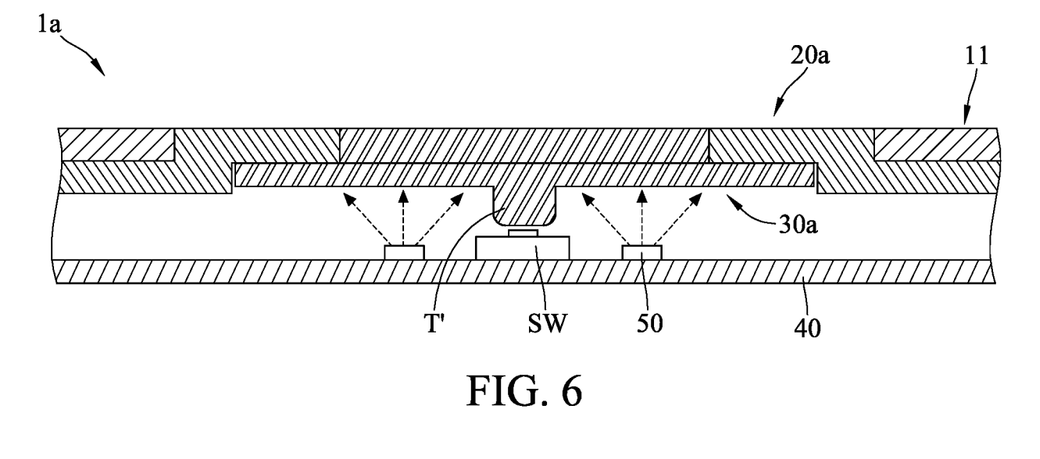
FIG. 6 is a partially enlarged cross-section view of a button structure according to another embodiment of the disclosure.

For example, referring to FIG. 6, a button structure 1a of another embodiment of the disclosure is provided, a reinforcement structure 30a is disposed to a first portion 20a, in specific, the reinforcement structure 30a is partially embedded in the first portion 20a and located between the first portion 20a and a contact structure T'. The reinforcement structure 30a is light-permeable. Thus, light is able to penetrate through the first portion 20a through the reinforcement structure 30a. Specifically, the button structure 1a may further include at least one light-emitting component 50 (e.g., a light-emitting diode) arranged between the circuit board 40 and the reinforcement structure 30a, the reinforcement structure 30a and the contact structure T' are integrally formed of a single piece, the reinforcement structure 30a is disposed through the first portion 20a (as shown, the reinforcement structure 30a is exposed from the first portion 20a), and the reinforcement structure 30a and the contact structure T' is made of light-permeable material. As such, the light emitted by the light-emitting component 50 can penetrate through the reinforcement structure 30a and therefore form a required glowing pattern at the outer surface of the first portion 20a.

Figure 7:
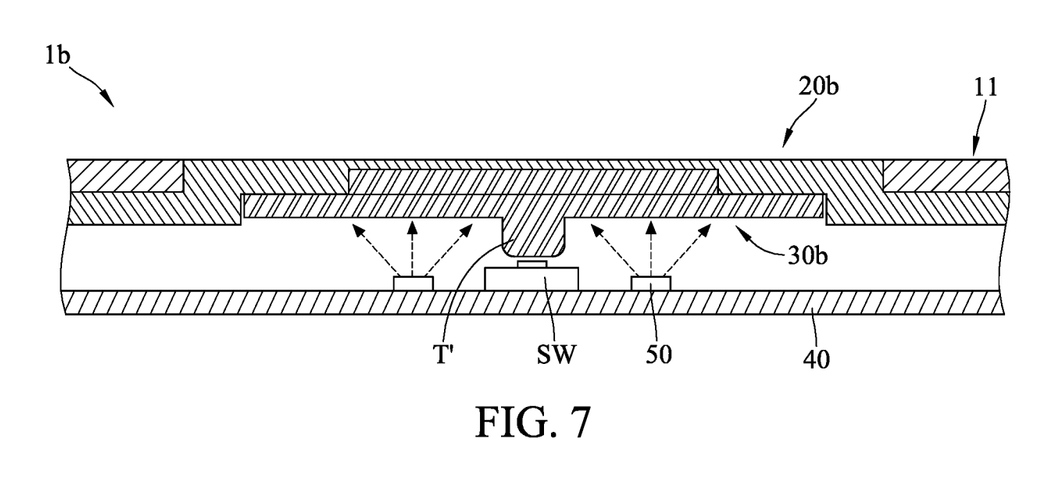
FIG. 7 is a partially enlarged cross-section view of a button structure according to another embodiment of the disclosure.

Alternatively, referring to FIG. 7, a button structure 1b of another embodiment of the disclosure is provided, a reinforcement structure 30b is disposed to a first portion 20b, in specific, the reinforcement structure 30b is partially embedded in a first portion 20b but does not penetrate through the first portion 20b; in other words, the reinforcement structure 30b is not exposed from the first portion 20b. In this embodiment, the first portion 20b and the reinforcement structure 30b may both be made of light-permeable material, thus the reinforcement structure 30b is still able to guide the light emitted by the light-emitting component 50 to form a required glowing pattern at the outer surface of the first portion 20b.

Figure 8:
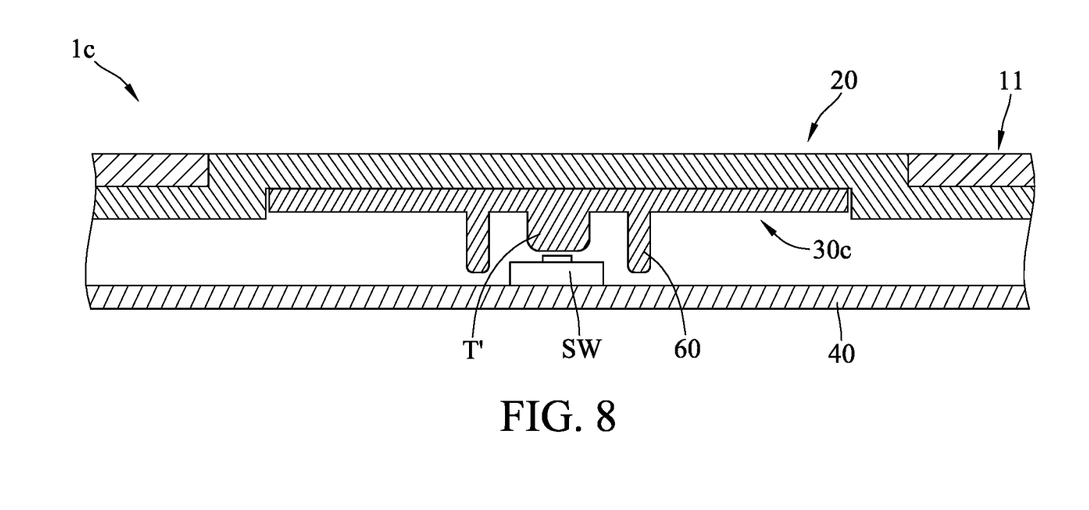
FIG. 8 is a partially enlarged cross-section view of a button structure according to another embodiment of the disclosure.
Figure 9:
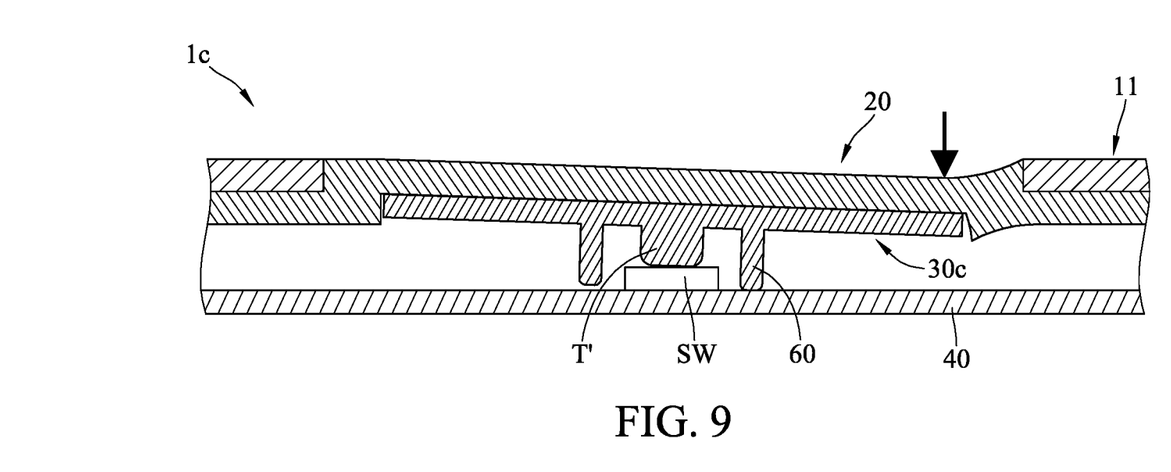
FIG. 9 is a schematic view showing how the button structure in FIG. 8 response to a press.

Alternatively, referring to FIGS. 8-9, a button structure 1c of another embodiment of the disclosure is provided, the button structure 1c may further include at least one stopper 60 integrally formed on the side of the reinforcement structure 30c facing towards the circuit board 40, the stopper 60 are arranged adjacent to the contact structure T' and protrude towards the circuit board 40. When the first portion 20 is pressed to make the contact structure T' contact the switch SW, the stopper 60 also presses against the circuit board 40, such that the stopper 60 is able to prevent the first portion 20 from being overly pressed and therefore can prevent the contact structure T' from damaging the switch SW.

Figure 10:
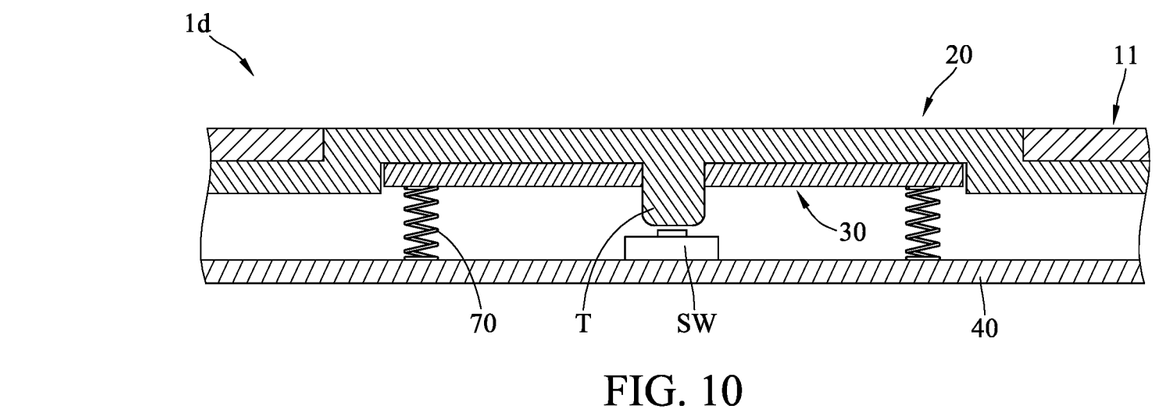
FIG. 10 is a partially enlarged cross-section view of a button structure according to another embodiment of the disclosure.

Alternatively, referring to FIG. 10, a button structure 1d of another embodiment of the disclosure is provided, the button structure 1d may further include at least one conductive elastic structure 70 connected to and located between the reinforcement structure 30 and the circuit board 40. The reinforcement structure 30 may be made of metal, such that the reinforcement structure 30 and the conductive elastic structure 70 may together form a shielding to prevent EMI (Electromagnetic Interference).

With the aforementioned exemplary and not limiting embodiments, it is apparent to those skilled in the art that a further modification and variation without departing from the scope or spirit of the disclosure can be made as required; for example, in other embodiments, the button structure may omit the contact structure so that the switch can be directly pressed by the first portion or the reinforcement structure.

According to the button structure and electronic device as discussed in the above embodiments of the disclosure, since the first portion located above the switch has a reinforcement structure thereon, the elastic deformation produced by applying force to the first portion is able to increase the downward movement of the first portion through the reinforcement structure. This ensures a press either near or away from the central area of the first portion to be able to easily and effectively trigger the switch below, thereby solving the problems of traditional buttons that have poor haptic feedback at specific press areas.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. A button structure comprising:
a circuit board with a switch thereon;
a first portion located above the switch, wherein the first portion has a center;
a second portion partially covering the first portion and surrounding the first portion; and
a reinforcement structure disposed on the first portion, wherein a Young's modulus of the reinforcement structure is higher than a Young's modulus of the first portion;

wherein, in a transverse direction substantially parallel to the circuit board, a distance between the center of the first portion and a joint between the first portion and the second portion is L1, a distance between the reinforcement structure and the second portion is D1, and the following condition is satisfied:

$$8/3 \leq L1/D1 \leq 4.$$

2. The button structure according to claim 1, wherein the reinforcement structure is located at a side of the first portion facing towards the circuit board.

3. The button structure according to claim 1, wherein a Young's modulus of the second portion is higher than a Young's modulus of the first portion.

4. The button structure according to claim 1, further comprising at least one stopper protruding towards the circuit board from the reinforcement structure.

5. The button structure according to claim 1, further comprising at least one conductive elastic structure connected to and located between the reinforcement structure and the circuit board.

6. The button structure according to claim 1, wherein in a transverse direction substantially parallel to the circuit board, a thickness of the first portion is T1, a distance between the reinforcement structure and the second portion is D1, and the following condition is satisfied:

$$2.92 \leq D1/T1 \leq 4.38.$$

7. The button structure according to claim 1, wherein in a transverse direction substantially parallel to the circuit board, a part of the first portion exposed from the second portion has a length at least greater than 30 millimeters.

8. The button structure according to claim 1, wherein in a transverse direction substantially parallel to the circuit board, a length of a part of the first portion exposed from the second portion is 2×L1, a length of the switch is L3, and the following condition is satisfied:

$$2 \times L1/L3 \geq 17.6.$$

9. The button structure according to claim 1, wherein a part of the first portion exposed from the second portion includes a central area and a periphery area, the central area corresponds to the switch and is connected to the second portion via the periphery area, at least part of the reinforcement structure overlaps with the central area.

10. The button structure according to claim 1, further comprising a battery located at a side of the first portion or the second portion, wherein the battery is electrically connected to the circuit board.

11. The button structure according to claim 1, further comprising a contact structure located between the first portion and the circuit board, wherein the contact structure is configured to be movable by the first portion and is configured to contact the switch, wherein at least part of the reinforcement structure is located between the contact structure and the second portion.

12. The button structure according to claim 11, wherein the contact structure is integrally formed with the reinforcement structure and protrudes toward the circuit board from the reinforcement structure.

13. The button structure according to claim 11, wherein the contact structure is integrally formed with the first portion and protrudes toward the circuit board from the first portion, and the reinforcement structure surrounds the contact structure.

14. The button structure according to claim 2, wherein the reinforcement structure is light-permeable.

15. The button structure according to claim 14, wherein at least part of the reinforcement structure is exposed from the first portion.

16. The button structure according to claim 14, wherein at least part of the reinforcement structure is disposed on the first portion, and the first portion is light-permeable.

17. The button structure according to claim 14, further comprising at least one light-emitting component arranged between the circuit board and the reinforcement structure.

18. An electronic device, comprising:
an outer casing having an accommodation space;
a first portion disposed on the outer casing and located at a side of the accommodation space;
a circuit board accommodated in the accommodation space, wherein the circuit board has a switch thereon, and the switch corresponds to the first portion; and
a reinforcement structure disposed on the first portion, wherein an orthogonal projection of the reinforcement structure onto a plane in which the circuit board is located does not overlap with an orthogonal projection of the outer casing onto the plane in a direction from the first portion towards the circuit board.

19. The electronic device according to claim 18, wherein a Young's modulus of the outer casing is higher than a Young's modulus of the first portion.

* * * * *